(12) United States Patent  
Corrigan

(10) Patent No.: US 7,535,404 B2  
(45) Date of Patent: May 19, 2009

(54) AIRPORT SAFETY SYSTEM

(76) Inventor: Nigel Corrigan, 4 Shearwater, Orton Wiston, Peterborough PE2 6YW (GB)

( * ) Notice: Subject to any disclaimer, the term of this patent is extended or adjusted under 35 U.S.C. 154(b) by 92 days.

(21) Appl. No.: 11/220,252

(22) Filed: Sep. 6, 2005

(65) Prior Publication Data

US 2006/0007035 A1    Jan. 12, 2006

Related U.S. Application Data

(63) Continuation-in-part of application No. 10/148,066, filed on May 24, 2002, now Pat. No. 6,947,742.

(51) Int. Cl.  
*G01S 13/93* (2006.01)

(52) U.S. Cl. .............. 342/29; 342/36; 342/57; 340/947

(58) Field of Classification Search ............ 342/29–37, 342/57, 58, 60, 147, 458; 340/947, 979, 340/980–983; 700/300, 301  
See application file for complete search history.

(56) References Cited

U.S. PATENT DOCUMENTS

| | | | |
|---|---|---|---|
| 3,099,834 A | 7/1963 | Sarbacher |
| 3,840,877 A | 10/1974 | Crane |
| 3,872,474 A | 3/1975 | Levine |
| 4,816,827 A | 3/1989 | Baloutch et al. |
| 5,017,930 A | 5/1991 | Stoltz et al. |
| 5,321,615 A | 6/1994 | Bailey et al. |

(Continued)

FOREIGN PATENT DOCUMENTS

EP          0744630 A2    11/1996

(Continued)

OTHER PUBLICATIONS

Flores, Jimenez A., International Search Report dated Sep. 3, 2001, pp. 1-4, Europe.

(Continued)

*Primary Examiner*—John B Sotomayor  
(74) *Attorney, Agent, or Firm*—Jackson Walker, LLP

(57) ABSTRACT

An airport safety system is disclosed, comprising surface movement radar for monitoring the movement of aircraft and land vehicles on an airport, said surface movement radar providing a signal input to a computer arranged to identify from the relative motions of aircraft and vehicles detected by the radar in accordance with a pre-programmed set of rules an aircraft at risk of collision. The computer is also programmed to cause transmission by radio of an audible alert signal when a risk is predicted, said radio transmission being at a standard aircraft communication frequency, such as the standard ground communication VHF radio channel. The alert signal can alternatively be transmitted by one of a plurality of message transmitting devices arranged at different locations adjacent to airport runways and taxiways, each message transmitting device comprising a radio transmitter connected to antenna means arranged to radiate a signal within a predetermined area at the location. The radio transmitters operate at standard Marker beacon frequency amplitude modulated by said alert signal. The computer is programmed to identify the transmitting device adjacent to said aircraft at risk of collision and to direct said alert signal to the transmitting device so identified for transmission thereby. In this way, the alert signal could be directed to only the aircraft involved.

4 Claims, 3 Drawing Sheets

U.S. PATENT DOCUMENTS

| | | | |
|---|---|---|---|
| 5,469,371 A | 11/1995 | Bass | |
| 5,519,618 A | 5/1996 | Kastner et al. | |
| 5,530,440 A | 6/1996 | Danzer et al. | |
| 5,566,359 A * | 10/1996 | Corrigan | 455/78 |
| 5,689,273 A * | 11/1997 | Bailey et al. | 342/407 |
| 5,793,329 A | 8/1998 | Nakada et al. | |
| 5,863,148 A | 1/1999 | Shivaram | |
| 5,936,574 A * | 8/1999 | Klaschka | 342/357.06 |
| 6,195,609 B1 * | 2/2001 | Pilley et al. | 701/120 |
| 6,947,742 B1 * | 9/2005 | Corrigan | 455/431 |
| 7,131,136 B2 * | 10/2006 | Monroe | 725/105 |
| 7,136,011 B2 * | 11/2006 | Mork et al. | 342/29 |
| 2004/0225440 A1 * | 11/2004 | Khatwa et al. | 701/301 |
| 2004/0252046 A1 * | 12/2004 | Mork et al. | 342/29 |
| 2006/0007035 A1 * | 1/2006 | Corrigan | 342/29 |
| 2006/0281435 A1 * | 12/2006 | Shearer et al. | 455/343.1 |
| 2007/0078591 A1 * | 4/2007 | Meunier et al. | 701/120 |

FOREIGN PATENT DOCUMENTS

WO  PCT/US98/27706  12/1998

OTHER PUBLICATIONS

Advanced Surface Movement Guidance and Control Systems (A-SMGCS) Manual; International Civil Aviation Organization; Fig. 3-3; pp. 3-12 (2004), (total 83 pages).

* cited by examiner

AIRPORT SAFETY SYSTEM

This is a continuation-in-part application based upon U.S. patent application Ser. No. 10/148,066, filed May 24, 2002, now U.S. Pat. No. 6,947,742, which claims foreign priority to GB Application Serial Nos. 9927816.0 (filed Nov. 25, 1999); 0021571.5 (filed Sep. 4, 2000); and 0428502.9 (filed Dec. 30, 2004).

FIELD OF THE INVENTION

This invention relates to an airport safety system for providing audible warning messages to aircraft of the risk of collision on or near the ground.

BACKGROUND TO THE INVENTION

During ground operations, i.e. taxiing, aircraft pilots rely solely on charts, taxiway markings and illuminated marker boards to determine their current location and the direction to their next position. Complex and unfamiliar airport layouts and/or low visibility conditions can lead to pilots mistakenly taking a wrong direction, leading to potentially dangerous situations, for example a taxiing aircraft turning on to a runway in the path of another aircraft taking off or landing, or an aircraft attempting to take off from the wrong runway, perhaps one obstructed by repair works or other aircraft. A less dangerous consequence of unfamiliarity with ground layout, but one with potentially significant economic effects, is that landing aircraft may slow down excessively after touch down to enable the pilot to locate his turn off to the taxiway. This increases the time the aircraft occupies the main runway, delaying its availability for the next landing. Any reduction in the capacity of the airport to handle incoming and departing flights has a very significant cumulative cost, and even small reductions in runway occupancy can effect substantial savings.

It is therefore desirable to provide pilots with better information as to their position on the airport and guidance as to routing on the ground, especially in low visibility conditions, for example in bad weather or at night.

Most aircraft are currently equipped with an Instrument Landing System receiver to receive signals transmitted by marker beacon transmitters during the approach to the runway. The Marker frequency is 75 MHz, and aircraft systems are arranged to receive one of three audio frequency tones distinguishing the approach markers, although now only two markers are generally provided, an outer marker at 400 Hz at four miles from the runway and a middle marker at 1.3 kHz at one mile from the runway, each with a distinctive audible modulation pattern. Receipt of the different tones causes a different coloured light to illuminate, i.e. blue for the outer marker and amber for the middle marker, to give the pilot an audible and visible indication of his distance from the runway. When the aircraft is on the ground, the Marker receiver is redundant. Further, while the gradual phasing out of ILS marker beacons in favour of more sophisticated navigational systems is beginning to take place, it will be some considerable time before the airborne equipment is no longer required.

It has been proposed to use the ILS receiver in a system to provide ground guidance information. U.S. Pat. No. 5,689, 273 discloses a system for guiding an aircraft by providing a pair of inductive loops disposed around each side of a path to be followed by the aircraft. An inductive sensor on the aircraft senses the composite magnetic field induced by the loops and produces an RF signal which is fed to the ILS system to give an indication of the deviation from the centre line of the path.

A further feature provides transmitters giving marker radio beams across taxiways/runways transmitting different tones to indicate the type of path in conjunction with the coloured light of the ILS system. While this system might enable the pilot to avoid confusion between a taxiway and a runway, for example, it cannot provide any clear guidance as to whether the pilot is heading in the correct direction on the correct taxiway or runway.

At larger airports the control of aircraft on the ground is aided by Surface Movement Radar, whereby a plan view of the airport, aircraft and vehicles is presented to the Air Traffic Controller. Improvements to Surface Movement Radar have introduced software analysis of aircraft and vehicle movements where predictions of hazardous proximity are alerted to the controller.

Such systems are commonly known through their acronyms, for example AMASS, Airport Movement Area Safety System or RIMCAS, Runway Incursion Monitoring and Conflict Alert System. The success of these predictive systems has been less than hoped for, due mainly to the difficulties in determining the points at which normal traffic separation deteriorates to become a hazard. Too broad a decision window and false alarms are too frequent; too narrow a decision window and alerts to the controller leave no time to rectify the situation. Additionally, even if an alert allows time for controller intervention, the VHF radio communication channel must be free to allow the controller to contact the pilots at risk. These deficiencies have long been recognized by the US National Transportation Safety Board.

SUMMARY OF THE INVENTION

According to the invention, there is provided an airport safety system, comprising surface movement radar for monitoring the movement of aircraft and land vehicles on an airport, said surface movement radar providing a signal input to processing means such as a computer arranged to identify from the relative motions of aircraft and vehicles detected by the radar in accordance with a pre-programmed set of rules an aircraft at risk of collision, said processing means also being programmed to cause transmission by radio of an audible alert signal when a risk is predicted, said radio transmission being at a standard aircraft communication frequency.

One embodiment of the invention provides a plurality of message transmitting devices arranged at different locations, each message transmitting device comprising a radio transmitter connected to antenna means arranged to radiate a signal within a predetermined area at the location, characterised in that the radio transmitter operates at standard Marker beacon frequency amplitude modulated by a voice message stored in message storage means connected to the transmitter, wherein the processing means is arranged to identify the transmitting device adjacent to said aircraft at risk of collision and to direct said alert signal to the transmitting device so identified for transmission thereby.

Preferably, each message transmitting device comprises detector means for detecting the presence of an aircraft within said predetermined area and for actuating the transmitter to transmit the voice message in response to detection of an aircraft.

The antenna may be a free-standing antenna arranged to radiate a directional signal in a pattern which will be intercepted only by an aircraft within the area, but preferably the antenna comprises a cable embedded in the ground surface over which the aircraft passes, for example a runway or taxiway, so as to radiate power just sufficient to be received by the aircraft when in proximity therewith.

The use of pre-recorded voice messages also permits the system to inform an aircraft's pilot of the aircraft's current location and to warn of approaching junctions or other features to which the pilot may need to be alerted. Means may be provided for changing the messages according to changes in prevailing conditions. For example, closure of a taxiway or runway can be announced. The updating means may comprise a communication link, permitting Air Traffic Control (ATC) to change the message in a selected message transmitting device simply by communicating with the device and recording the new message. The communication link may be a wired link, but it could alternatively be a radio link, for example a cellular telephone link. The recording of the voice messages will be conveniently implemented digitally in solid state memory devices, to minimise maintenance required, although other recording and playback devices could be used.

Electrical power for the transmitters could be provided from the same circuits that provide taxiway edge lighting; when the conditions require the lighting to be switched on, the system of the invention is also powered up automatically.

Power output for the system will typically be of the order of a few milliwatts, and so interference with the conventional marker beacons would not occur. The use of the 75 MHz Marker Beacon frequency would not constitute a problem as this frequency is applied to aeronautical navigation by the International Telecommunications Union.

It would be possible to install the same type of Marker receiver to ground vehicles to enable them to benefit from the guidance and warning messages provided by the system.

The usefulness of the system may be further enhanced by incorporating in the message transmitting device means for sensing the direction of motion of the aircraft. Such means could, for example, be connected to a pair of spaced inductive loops across the path of the aircraft, the sequence of signals from the two loops being used to provide the indication of direction. According to the direction sensed, one of two different pre-recorded messages may be transmitted to the aircraft. It will be understood that other motion sensing devices could be used as an alternative.

An important aspect of the simplest form of the system according to the invention is that it may be implemented with no change whatsoever to aircraft; the system would become operational in all aircraft equipped with Marker receivers as soon as it is installed in the airport, since Marker receivers are capable of receiving and reproducing audio frequencies without adaptation.

Another aspect of the invention provides a system for providing to an aircraft equipped with a Marker receiver data relating to ground conditions/layout at an airport, the system comprising a transmitter located beneath the approach flight path of the aircraft transmitting a substantially vertical radio beam at Marker Beacon standard frequency and modulated with a data signal representing said ground conditions/layout information, means connected to the Marker receiver in the aircraft to demodulate the data signal, and display means for providing a visual display of the information represented by the data.

For example, the data may provide precise relative positions of all significant ground navigational points on the airport, such as the point on the runway at which a high speed turn off begins, and the radius of that turn off. Once an aircraft has established its precise position by passing over the runway located ground marker in accordance with the other aspects of the invention, the relative position of the beginning of the taxiway turn off is known, together with information about all the taxiways. A moving aircraft may then keep track of its position on the airport by means of, for example, accelerometers and directional information sensors, updating the information each time the aircraft passes over successive ground markers, which may identify themselves and their position by means of data code.

BRIEF DESCRIPTION OF THE DRAWINGS

In the drawings, which illustrate exemplary embodiments of the invention.

DETAILED DESCRIPTION OF THE ILLUSTRATED EMBODIMENTS

Figure 1:
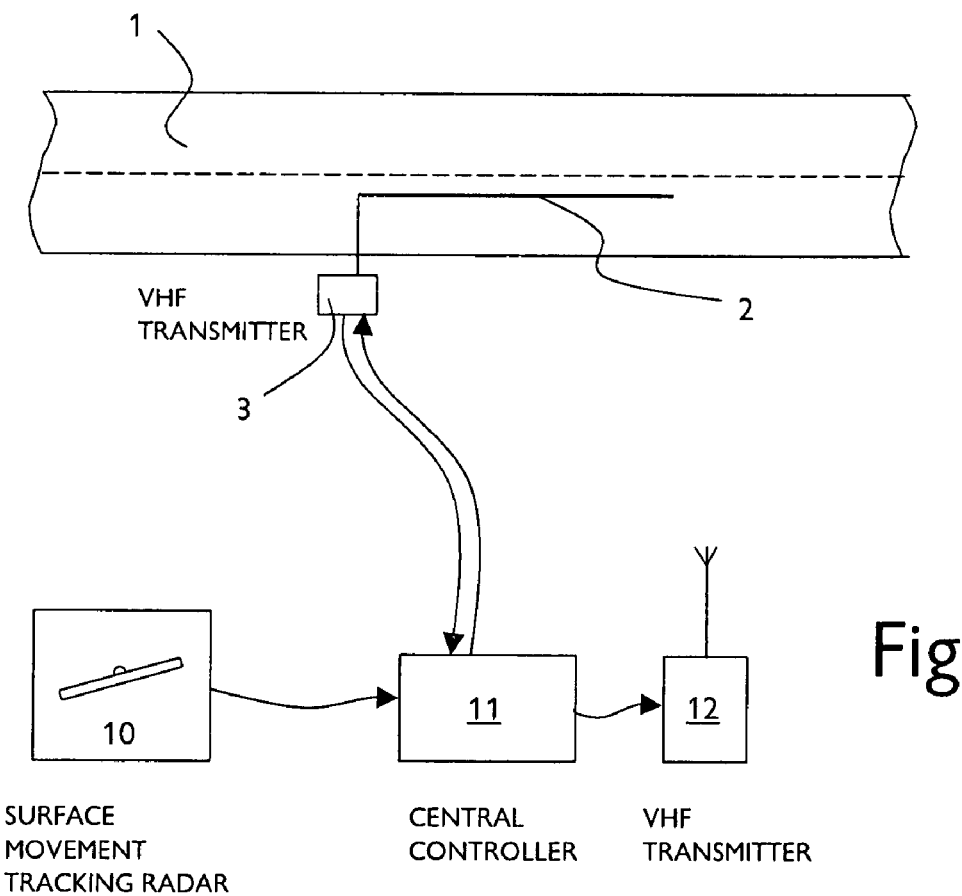
FIG. 1 is a diagram of an airport runway or taxiway with the basic system installed.

Referring first to FIG. 1, an airport runway or taxiway 1 has embedded in the surface thereof a radio antenna in the form of a radiating cable 2 fed with a 75 MHz signal from a message transmitting device 3, conveniently located alongside the runway or taxiway and provided with electrical power from the edge lighting system present in most runways and taxiways. The 75 MHz carrier signal from the transmitter is modulated (amplitude modulation, in accordance with standard practice) with a pre-recorded voice message giving positional information, for example "Taxiway Golf, Northbound Delta, Southbound Bravo". The transmitter may simply be arranged to operate passively, in other words repeating the message at regular intervals regardless of the presence or absence of an aircraft in the vicinity, but is preferably provided with means for detecting the presence of an aircraft within range of the signal radiated by the antenna to cause activation of the transmitter. The detecting means may be any of a number of known devices, for example a paired infra red transmitter and receiver, continuity of the beam between them being interrupted by passage of the aircraft.

The airport will be provided with a plurality of such transmitters 3 at locations on runways and taxiways where conflict between moving aircraft could occur, i.e. where a taxiway crosses a runway or another taxiway. Each of the transmitters 3 is connected to a central controller 11 so that voice messages can be transmitted from the central controller to a selected transmitter 3 and so that the transmitter can signal to the central controller detection of an aircraft at the specific location. The central controller 11 is also connected to the airport's surface movement tracking radar 10, which monitors all vehicle ground movements on the airport and predicts from such movements the likelihood of one vehicle coming into collision with another. As hereinbefore described, such systems are arranged to generate an alerting signal when a potential conflict is identified. In accordance with the present invention, the alerting signal is directed to the central controller 11 with data as to the identity and location of the vehicles involved. The central controller can then identify the 75 MHz transmitter 3 nearest to each of the vehicles involved and send a warning voice message from a selection of pre-recorded messages, according to the level of threat identified, to be transmitted by the relevant transmitters 3 to the adjacent vehicles. Alternatively, or additionally, a warning voice message is directed by the controller 11 to a VHF transmitter 12 operating on the standard airport ground frequency, causing the message to be broadcast immediately. All aircraft listening on that frequency will receive the warning message; it will be apparent to the pilots of the aircraft whether or not the message is relevant to them.

It will be understood that references to vehicles will typically mean aircraft, although the system may identify and warn against potential collisions between aircraft and ground vehicles on taxiways.

Figure 2:
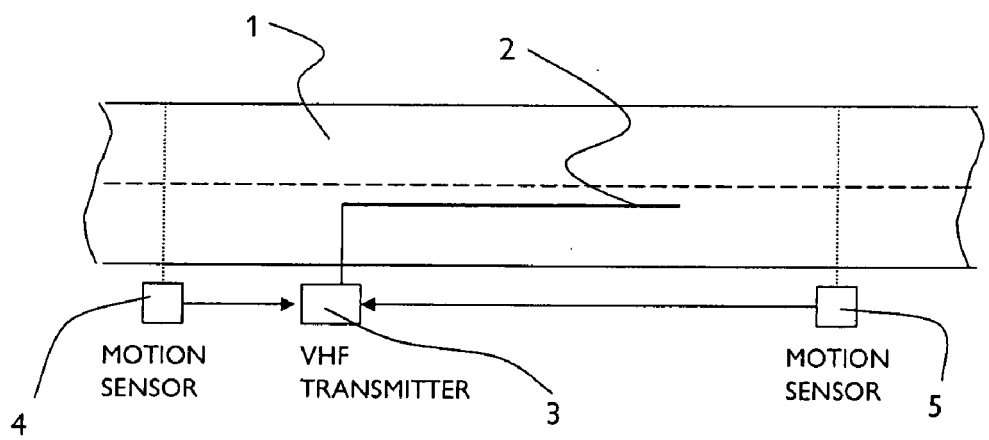
FIG. 2 is corresponding diagram of a system including aircraft motion sensors.

The system illustrated in FIG. 2 adds directional or motion sensors 4 and 5 to the basic system illustrated in FIG. 1. The sensors are arranged ahead of the cable 2 for each direction of travel along the taxiway 1, and serve to provide an indication of the direction of movement of the aircraft relative to the transmitter, i.e. left to right or right to left, triggering the selection of the appropriate one of two audio messages, for example: "Taxiway Charlie; expect left to Delta, right to Runway." Or "Taxiway Charlie; expect right to Hotel, left to Runway". This arrangement can also be used at stop bars.

Figure 3:
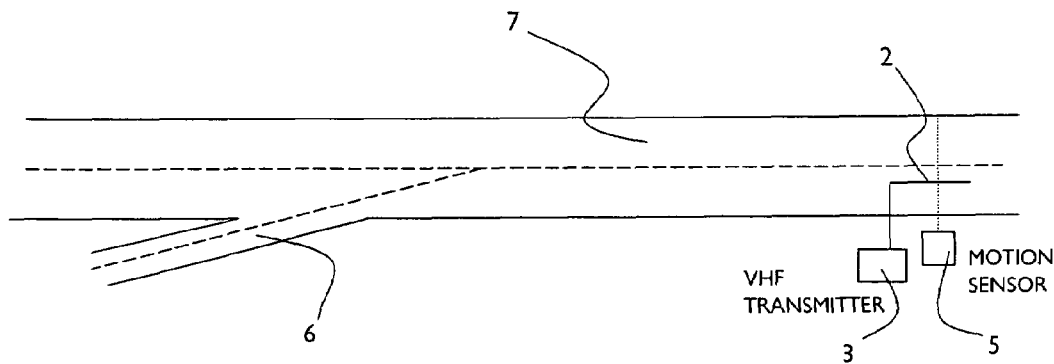
FIG. 3 is a diagram of an installation warning of a high-speed turn off from a runway.

In the configuration shown in FIG. 3, the transmitter and antenna are installed at a predetermined distance from a high-speed turn off 6 from a runway 7 at which landing aircraft leave the runway for taxiways. In its simplest form, it may be configured to give an audible warning of the distance to the turn off, assisting the pilot in judging the correct speed of approach. This has the benefit of enabling the pilot to leave the runway in the shortest possible time, freeing it for the next aircraft to land or take off. However, the system of the invention may be adapted to transmit to the aircraft using the same transmitter and antenna a string of data providing additional information to assist the pilot in navigating around the airport, or simply to quit the runway via the turn off 6. This embodiment requires the installation of additional equipment in the aircraft, as described hereinafter with reference to FIGS. 4 and 6, but does not affect the transmission of voice warning messages to the Marker receiver of aircraft not fitted with the additional equipment. The data transmitted to suitably-equipped aircraft may include runway length and slope, distance to high speed turn offs, distance to right angle turn offs, high speed turn off angle, runway state (wet/dry), confirmation of the aircraft's ground speed from external detectors, and a ground plan of the airport taxiways. This information may be decoded by the additional equipment for display via the existing weather radar display, a multi-function display unit (MFDU) or a head-up display (HUD). A similar arrangement may provide in addition accelerate/stop information to aircraft taking off.

Figure 4:
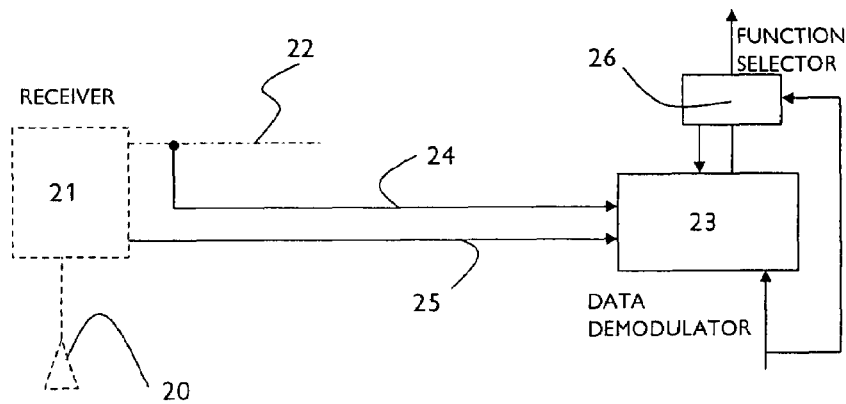
FIG. 4 is a block diagram of optional additional equipment to be installed in an aircraft to provide for the display of guidance and other data.
Figure 5:
FIG. 5 is a diagram of an alternative arrangement to that shown in FIG. 1.

While some embodiments of the invention will operate with existing Marker receivers in aircraft without any additional equipment, the system of the invention may be used to provide additional data to aircraft relating to the airport and its taxiways, and to the movement of the aircraft on them. FIG. 4 is a diagram illustrating additional equipment which may be installed in the aircraft to work with the Marker receiver. In the diagram, the existing Marker receiver components are shown in broken lines. The receiver antenna 20 is mounted on the underside of the aircraft, since the marker beacons are arranged to provide a vertical beam to overflying aircraft. The receiver 21 is connected to the antenna and provides a signal output via wiring 22 to an audio system and light indication system (not shown). A data demodulator 23 is connected via first wires 24 to the audio wiring 22 and via second wires 25 to the automatic gain control test point in the receiver 21. The data demodulator 23 extracts from the modulated portion of the signal the data representing the heading of the runway, which it uses to determine which of the signals received from the two cable antennae represents left and which right. The data demodulator also compares the two signal strengths, as hereinbefore described, and provides an output to the appropriate display device, as hereinbefore described, via a function selector 26. In the case of video displays, the demodulator unit 23 includes a video generator. Inputs from existing systems in the aircraft may be provided to supplement the information provided by the system of the invention, for example Heading, Ground Speed, GPS (Global Positioning System) position data and Aircraft Type. FIG. 5 illustrates an alternative antenna arrangement to that shown in FIG. 1, in which a horn or panel antenna 30 connected to the transmitter 31 is mounted alongside a taxiway or runway 32 so as to direct a fan-shaped beam across the taxiway/runway such that radiation from the transmitter is reflected from the fuselage of a passing aircraft, and the taxiway, to the Marker receiver antenna on the aircraft.

Figure 6:
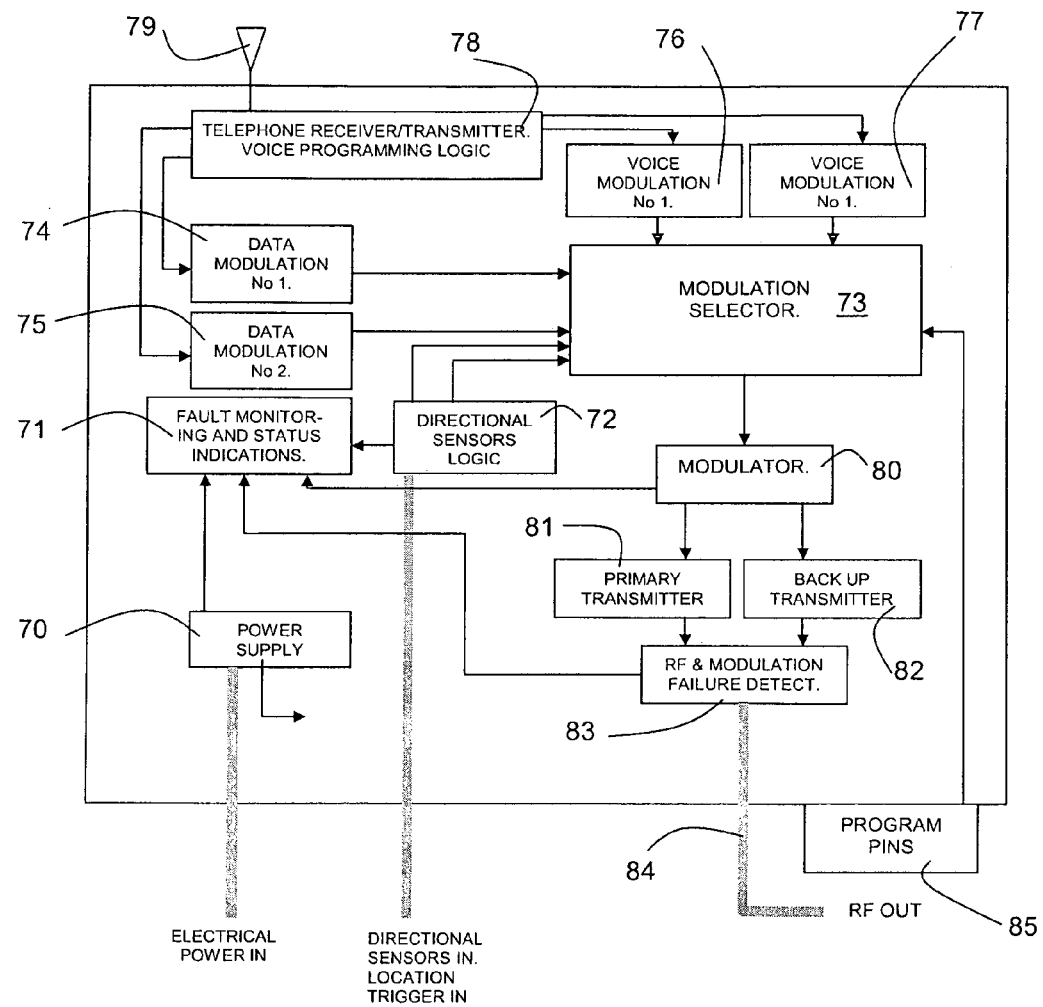
FIG. 6 is a block diagram of a message transmitting device in accordance with a preferred embodiment of the invention.

FIG. 6 shows in block diagram form the typical arrangement for a message transmitting device in accordance with the invention. The device is conveniently configured as a weather-proof body having a number of modules or cards mounted in it for ready replacement in the event of faults. A power supply 70 is suitably connected to the runway or taxiway edge lighting circuit, so that the device automatically operates when the edge lights are switched on in low visibility conditions. It will be appreciated, however, that a separate power supply may be arranged to enable the device to operate independently of the edge lighting. A fault monitoring and status indicating module 71 receives inputs from other components in the device and monitors normal operation thereof. In the event of a component failure, this is arranged to illuminate an external fault indicator light, but it could also initiate signalling via the telephone system to ATC. Input from directional/presence sensors is received in a directional sensors logic module 72 to cause initiation of transmissions from the device. According to the direction sensed, an actuating signal is sent by module 72 to a modulation selector module 73, which can receive inputs from data storage modules 74 and 75 and from voice storage modules 76 and 77. Each of the storage modules 74-77 is connected to a telephone receiver/transmitter and voice programming logic module 78, connected to an antenna 79 to permit communication with Air Traffic Control (ATC) via a dedicated radio telephony system or by a secure cellular telephone system. The programming logic module 78 permits the ATC to record new voice messages for storage in the appropriate voice storage module 76 or 77 in digital form, the modules 76 and 77 being suitably solid state memory devices. Non-voice data can also be downloaded into the data storage modules 74 and 75. The modulation selector 73 directs the appropriate voice message or data string to a modulator 80, which is in turn connected to a primary transmitter 81 and a back up transmitter 82, which operates in the event of failure of the primary transmitter, detected by the RF and modulation failure detection module 83 interposed between the transmitters and the output cable 84 to the antenna. Program pins 85 are provided for connection of a programming device (e.g. a portable computer) at the transmitter device to permit reprogramming, or to strap the transmitter to a specific mode, i.e. data or voice.

What I claim is:

1. An airport safety system, comprising
   surface movement radar for monitoring the movement of aircraft and land vehicles on an airport, said surface movement radar providing a signal input to processing means arranged to identify from the relative motions of aircraft and vehicles on the surface of the airport detected by the radar, in accordance with a pre-programmed set of rules for analysis of aircraft and vehicle movements to predict hazardous proximity, an aircraft at risk of collision with another aircraft on the ground or with a land vehicle, said processing means also being programmed to cause, in response to identification of an aircraft at risk of collision, transmission by radio of an audible alert signal; and a plurality of message transmitting devices arranged at different locations adjacent to airport runways and taxiways, each message transmitting device comprising a radio transmitter connected to antenna means arranged to radiate a signal within a predetermined area at the location, each radio transmitter operating at standard Marker beacon frequency amplitude modulated by said alert signal, wherein the processing means is arranged to identify the transmitting device adjacent to said aircraft at risk of collision and to direct said alert signal to the transmitting device so identified for transmission thereby.

2. A system according to claim 1, wherein the antenna is a free-standing antenna arranged to radiate a directional signal in a pattern which will be intercepted only by an aircraft within the area.

3. A system according to claim 1, wherein the antenna comprises a cable embedded in the ground surface over which the aircraft passes so as to radiate power just sufficient to be received by the aircraft when in proximity therewith.

4. A system according to claim 1, wherein each message transmitting device comprises detector means for detecting the presence of an aircraft within said predetermined area and for actuating the transmitter to transmit the voice message in response to detection of an aircraft.

* * * * *